Oct. 31, 1967　　　J. A. LOHMAN III　　　3,349,679
PHOTO IDENTIFICATION APPARATUS
Filed April 7, 1965　　　　　　　　　　　　　　　　2 Sheets-Sheet 1

INVENTOR,
J. A. LOHMAN III
BY Watson, Cole, Grindle & Watson
ATTORNEYS

Oct. 31, 1967
J. A. LOHMAN III
3,349,679
PHOTO IDENTIFICATION APPARATUS
Filed April 7, 1965
2 Sheets-Sheet 2
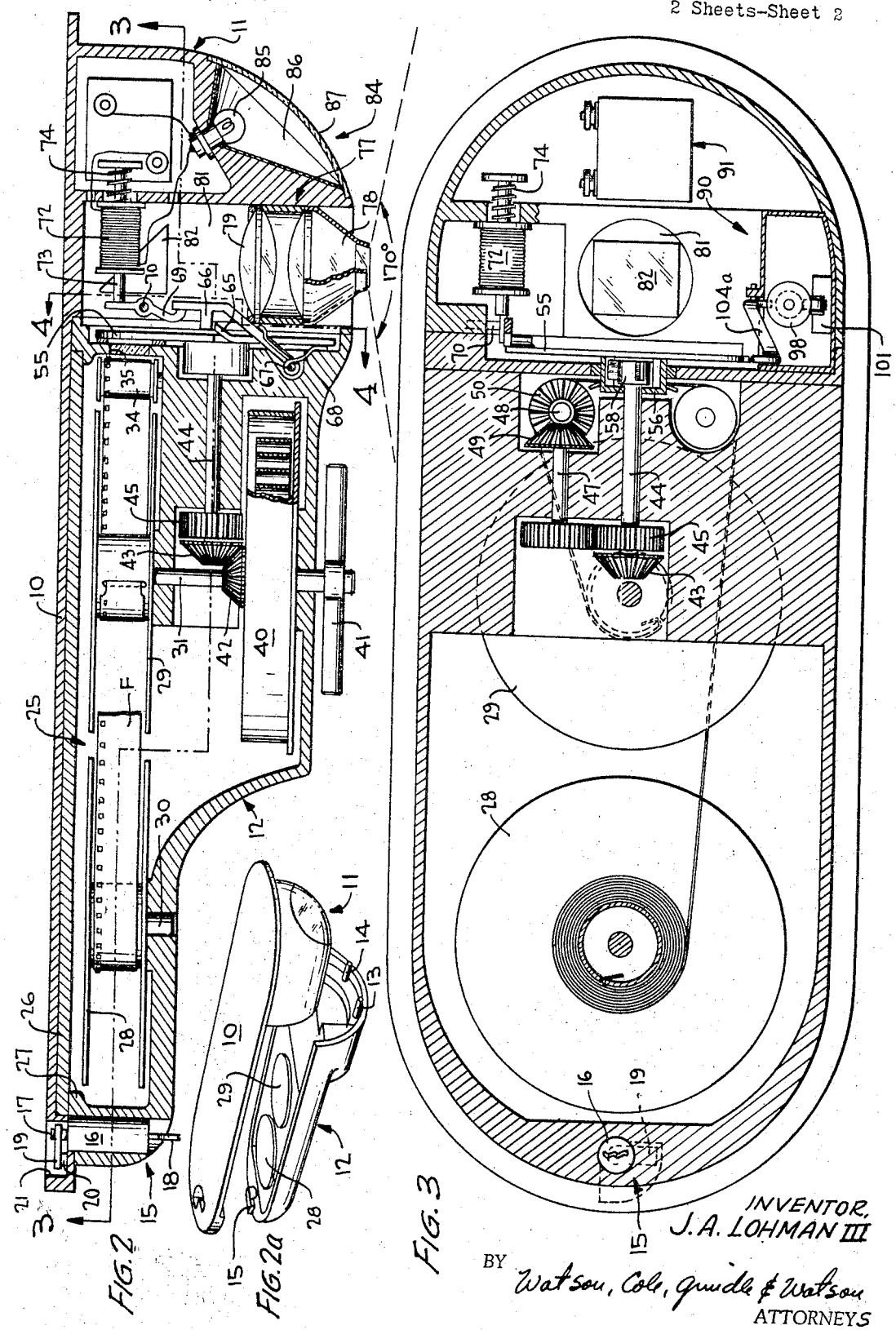
INVENTOR,
J. A. LOHMAN III
BY Watson, Cole, Grindle & Watson
ATTORNEYS 3,349,679
PHOTO IDENTIFICATION APPARATUS
Joseph A. Lohman III, 1200 Powhatan St.,
Alexandria, Va. 22314
Filed Apr. 7, 1965, Ser. No. 446,250
11 Claims. (Cl. 95—11)

ABSTRACT OF THE DISCLOSURE

An apparatus for controlling a camera for photographing persons in a confined space including circuit and switch means responsive to the sequence of opening and then closing the door to said confined space. There is also included a flash unit for illuminating the confined space and a time delay means for insuring optimum positioning of the person whose picture is being taken after the door is closed.

---

The present invention relates to photo identification apparatus and, more particularly, to an automatic system for photographing a person located in a confined space, such as a vehicle, for the purpose of later identification of the person and his surroundings.

In the past, many efforts have been made along the lines of providing a system for photographing persons at particular times, which systems are automatically actuated by the person being photographed. These prior devices have usually been broadly related to crime detection systems and have included, in most cases, a camera and a flash for taking a picture, and a supporting electrical system for simultaneously lighting the flash and tripping the shutter of the camera. The means for automtically activating the electrical system in the prior art when a person comes within the desired area have usually included expensive photo-electric or, in other cases, weight actuated means. While these devices have been generally successful for the purpose indicated, much is left to be desired not only as to the cost of such devices but also in terms of their successful operation in a confined space. For example, in a confined space as contemplated by the invention, it has been found that the movement of a person in such a space usually causes repeated activations of the control circuit in a sporadic manner when a photo-electric or similarly actuated device is utilized, thereby causing a wasteful number of pictures to be taken of a single subject. Moreover, due to the nature of the design of the camera and lens system of prior devices, it has heretofore been impossible to obtain a clear picture of the subject for identification purposes along with a complete picture of his surroundings at the time he is photographed.

Therefore, it is one object of the present invention to overcome the difficulties mentioned above and to provide a photo identification system for photographing a person in a confined space.

It is another object of the present invention to provide a system of the type described for photographing a person and his surroundings that is automatically actuated by means not dependent upon the subject's movement in the space he occupies.

More specifically, this invention contemplates the use of an integral camera and floodlight or flash device that is easily mounted on one wall of a confined space and actuated by an arrangement responsive to the sequence of first opening the door to said space and then closing said door whereby a picture is taken. The device of the present invention is particularly adapted for use in an automobile, such as a taxicab, for identifying each passenger or group of passengers that occupy the cab. In this case, the novel camera and flash unit are mounted on the roof of the cab so as to clearly view not only the passengers in the back seat, but also the driver of the cab as well as the cab's meter, clock or the like. Further, in accordance with the preferred embodiment of the invention, the camera and flash unit are actuated in response to the sequence of first opening the door of the taxicab and then closing the door as determined by the usual dome light circuit of said taxicab. Also, in accordance with another aspect of the present invention, the control system may include a time delay relay to allow the person who has just entered the taxicab to assume a forward position in which he can more easily be photographed for subsequent identification in the case where, for instance, a wrongful act against the cab driver is late committed.

Accordingly, it is another object of the present invention to provide an integral flash and camera unit that can easily be mounted in a taxicab or the like to serve as a deterrent against crime and to provide evidence against the wrongdoer in case a crime is actually committed.

It is another object of the present invention to provide such a device that is desirably simple in construction and, thus, relatively low in cost so that many public vehicles can be easily equipped with the same.

It is another object of the present invention to provide a device particularly adapted for use in a vehicle for recording the presence of each passenger or group of passengers whereby an accurate report is provided, for not only future identification of wrongdoers, but also for registering the number of passengers carried for company accounting purposes.

Still another object of the present invention is to provide a photo identification system having substantially a 170° field of vision whereby a picture can be taken in a minimum amount of space including all of the surroundings of the subject being photographed.

A still further object of the present invention is to provide a system of the type described wherein the control circuit is activated only after the subject being photographed has been completely within the confined space viewed by the camera for a predetermined amount of time.

Still another object of the present invention is to provide a camera and control system therefor for the purpose indicated having parts cooperating in a novel manner for taking a picture in a confined space automatically in response to the sequence of opening and closing of the door to said space.

A still further object of the present invention is to provide a novel control system having a time delay relay in a timing circuit for actuating the flash and the shutter of the camera and a cam that is operative to close a switch in the timing circuit in response to the sequence of first opening the door to the confined space and then closing the door, and wherein said cam is moved to an inoperative position to open said switch in response to the final stage of movement of the shutter of the camera indicating that a picture has been taken.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

Referring to the drawings:

FIG. 2 is a longitudinal cross-sectional view of a portion of the device of the present invention;

FIG. 2a is a perspective view showing the interrelationship of parts of the device shown in FIG. 2;

FIG. 3 is a cross-sectional view taken along lines 3—3 of FIG. 2;

Figure 1:
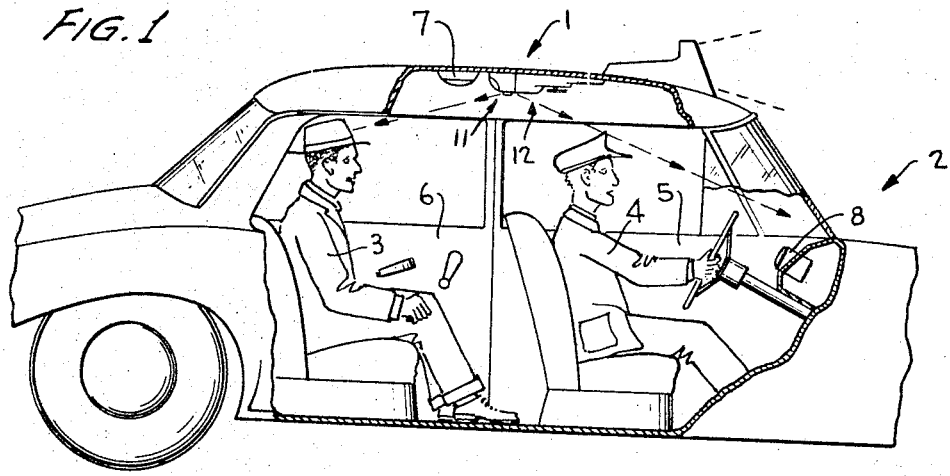
FIGURE 1 is a view of a preferred use of the apparatus of the present invention in a vehicle, such as a taxicab, with parts of the vehicle broken away for clarity.

For the detailed description of the present invention, reference is now made to the drawings, and particularly to FIGURE 1, wherein is disclosed a particular environment in which the novel camera and flash unit of the photo identification system of the present invention can be mounted for utilization. In this instance, a camera and flash unit 1 is mounted in the overhead position in an automobile, such as a taxicab, generally represented by the reference numeral 2. In the confined space within the automobile 2, sits a passenger 3, along with a driver 4; the latter being subjects of a picture taken by the flash and camera unit 1, as will subsequently be apparent. At this point, it is emphasized that the flash and camera unit 1 is not limited in its use to the environment of or in combination with a taxicab as illustrated, but is well adapted for use in other environments where it is desired to record the presence of a subject in a confined space that is entered through a door, such as a bank vault, a closet, a small room, or the like. In order to facilitate the understanding of the invention it will be described herein as it is used in the taxicab 2.

Continuing now with the description of this preferred embodiment of the invention, it can be seen that the taxicab 2 is of the type having any number of doors 5, 6 (the near side doors in FIG. 1 being broken away for clarity) and a dome light 7 for lighting the interior of the car, as either of the several doors 5, 6 are opened. It is contemplated by this invention that the field of vision of the flash and camera unit 1 is protracted so as to include substantially the whole interior of the cab 2, including a suitable clock, meter or speedometer 8 for further identification in the picture taken. Also, with such an arrangement, even the outside surroundings can, in certain instances, be recorded by the unit 1 through the windows of the cab 2.

With reference now to FIGURES 1, 2 and 2a of the drawings, the flash and camera unit 1 of the present invention is shown to be made up of a base plate 10 having an integral and rearwardly facing housing containing the lens, flash and control components, generally represented by the reference numeral 11, and a removable camera housing, generally indicated by the reference numeral 12. In use, the base plate 10 is permanently attached by any number of suitable fastening means (not shown in any of the drawings) to the roof of the cab 2 that is desired to be monitored for the purpose described. The camera housing 12 is designed to be positioned in the operative position in engagement with the base plate 10 and the rear housing 11 by means of a pair of outwardly extending pins 13, 14 on the rearward face of the housing 12, which pins 13, 14 cooperate with complementary apertures in the housing 11 (not shown) and a conventional circular lock 15, positioned adjacent the forward end of the housing 12, as best shown in FIG. 2a.

The lock 15 may take the form shown in FIG. 2, wherein is shown a cylinder 16 having a shaft 17 pivotal in response to the turning of a key 18. Upon turning the key 18, the swing lever 19 fixed on the shaft 17 can be brought from the inoperative position (indicated in FIG. 3 in phantom lines) into engagement with a suitable cam surface 20 located in a cut-out portion 21 formed in the front of the base plate 10.

The housing 12 has an opening, generally indicated by the reference numeral 25, along the entire upper surface thereof, which opening is normally covered by a lid 26 resting on a peripheral shoulder 27 formed in the body of the housing 12. Inside the upper portion of the housing 12, there are provided a storage reel 28 and a take-up reel 29, which are journaled for rotation in the body of the housing 12 by the shafts 30, 31, respectively; it being understood that a conventional film cartridge can be used instead, if desired. A suitable length of film F is provided on the reels 28, 29 and is trained about a pair of capstans 33, 34 (see FIG. 4) for conveying the film F past an exposure window 35 situated in the rear wall of the housing 12.

Thus, it can be seen that the film F can easily be changed in the device of the present invention by simply unlocking the lock 15 by moving the swing lever 19 to the unlocked position free of the cam 20, as shown in the phantom line view of FIG. 3, whereupon the housing 12 may be moved downwardly and forwardly to disengage the locking pins 13, 14 from their cooperating apertures whereby access to the lid 26 is easily obtained. The film F can then be removed for processing and replacement with fresh film by simply removing the lid 26 and withdrawing the spools 28, 29 or film cartridge, as the case may be.

A conventional spring motor 40 is provided to drive the take-up spool 29 and the film-driving capstan 33 for feeding the film F past the exposure window 35. A handle 41 is supplied to allow winding of the motor 40 in the usual manner, and the motor 40 imparts the stored-up driving force to the take-up spool 29 through the latter's supporting shaft 31. For relaying the driving force of the shaft 31 to the capstan 33, a bevel gear 42 is fixedly secured to the drive shaft 31 and positioned to cooperate with a similar bevel gear 43 mounted on the end of a shutter loading shaft 44, which is also journaled for rotation in the body of the housing 12. Fixedly mounted on the shaft 44 adjacent the bevel gear 43 is a spur gear 45 that cooperates with a companion spur gear 46, as seen in FIGURE 3, to drive a relay shaft 47 and, in turn, to drive a drive shaft 48 for the sprocket 34 through the intermediary of a pair of cooperating bevel gears 49, 50. The film driving operation by the means just described is performed in an automatic manner after each picture has been taken by the device of the invention, and this driving operation is desirably initiated as a direct result of the completion of the previous exposure in a manner presently to be described.

Figure 4:
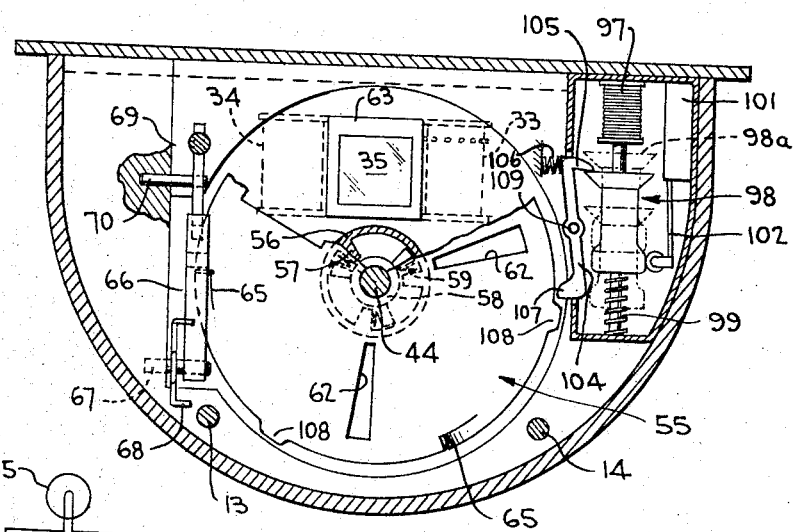
FIG. 4 is a cross-sectional view taken generally along lines 4—4 of FIG. 2 with certain parts broken away for clarity.

The device of the invention utilizes a circular focal plane shutter, generally indicated by the reference numeral 55, as best shown in FIG. 4. The shutter 55 is provided with an integral hub 56 having spaced radial members 57 for rotatably supporting the hub 56 and the shutter 55 on a three-pronged sprocket 58 secured to the shutter loading shaft 44. Interposed between the prongs of the sprocket 58 and the radial supporting members 57 of the hub 56 are springs 59, which serve to rapidly rotate the shutter at the proper time.

Still referring to FIG. 4, the shutter 55 is or may be of the type having a plurality of radial slots 62 adapted to traverse across the face of the exposure window 35 upon being properly rotated in the clockwise direction, as viewed in this figure. To prevent rays of light from entering the exposure window 35 other than through the radial slots 62 of the shutter 55, there is provided around the periphery of the window 35, a conventional light seal 63 formed of felt, wool, or similar material and adapted to engage the rear face of the shutter 35, as clearly shown in FIG. 2.

Positioned around the periphery of the circular shutter 55 are a plurality of stop members 65, which may take the form of a bent-up portion of the body of the shutter 55. A latch 66 is disposed for engagement with each of the stop members 65 and is pivotally mounted on pivot pin 67 and biased into the path of said stop members 65 by a suitable spring 68 conveniently mounted on the pivot pin 67. Disposed above and in operative engagement with the terminal end of the latch 66 is a toggle lever 69 pivotally mounted on a suitable pin 70. The toggle lever 69, in turn, is operated by a solenoid 72 having an armature 73 operatively engaged with the upper portion of the toggle lever 69. Upon actuation of the solenoid 72, the armature 73 is adapted to move to the right, as viewed in FIG. 2, and upon the subsequent opening of the solenoid operating circuit, a spring 74 moves the armature 73 to the left and the normal rest position illustrated.

It should be noted at this point, that when it is desired to remove the camera housing 11 in the manner previously described, the terminal end of the latch 66 can be easily disengaged from the toggle lever 69 by a slight twisting motion and manipulation of the housing 12 during the withdrawing movement.

It should now be clear that the operation of the camera of the present invention in advantageously initiated by the operation of the solenoid 72. When this occurs, the toggle lever 69 is caused to rotate in a counter clockwise direction, as viewed in FIG. 2, whereupon the latch 66 is disengaged from the stop member 65 due to the fact that the latch member 65 will be pivoted about the pin 67 against the force of the spring 68 by the free end of said toggle lever 69. After this has happened, the shutter 55 is now free to rotate in the clockwise direction as viewed in FIG. 4 to bring the first aperture 62 past the exposure window 35, as a result of the stored-up energy in the three springs 59. Since the mass of the shutter 55 and the integral hub 56 is designed to be very small, the force of the springs 59 is able to sweep the exposure aperture 62 next in line past the exposure window 35 in a rapid fashion. As the shutter 55 reaches its final stages of rotation, the latch 66 has been released by the toggle lever 69 due to the deactivation of the solenoid 72, by means to be described subsequently, so that the spring 68 can bring the operative face of the latch 66 into the path of the succeeding stop member 65 whereby a double exposure by the succeeding aperture 62 passing the film F is prevented. At this point, the springs 59 have been expanded to their greatest extent, and this allows the sprocket 58 on the shaft 54 to rotate in the clockwise direction, as viewed in FIG. 4, in order to reset the springs 59 for the next picture-taking operation. It will be remembered that the motive force for this operation of compressing the springs 59 is gained from the main spring motor 40 via the shaft 44; and, once the shaft 44 is permitted to turn, as just described, the reel 29 and the capstan 34 will be actuated to advance the film to the next position, which is determined by the final resting position of the sprocket 58 in the shutter-loaded condition of FIG. 4.

It will be remembered that one of the important aspects of the present invention is to provide a photo identification system having a range of vision through substantially 170° in order to observe substantially the entire interior of the automobile 2, as illustrated in FIG. 1. This feature is particularly desirable since it allows the camera to not only include the picture of the subject 3 but also to include his entire surroundings including the driver 4, as well as the meter 8.

For this purpose, there is provided a lens system 77 including a wide-angle or condenser lens 78 and a convergence lens 79. The lens system 77 further includes an outer case 80 to prevent unwanted light rays from entering the system and to suitably mount the lens system 77 along the upwardly extending channel 81 in the rear housing 11. A prism 82 is mounted above the lens system 77 in the channel 81 to turn the image provided through the lens system 77 through 90° whereby it can pass through the exposure window 35 to the film F upon the actuation of the shutter 55.

The wide-angle lens 78 is, or may be, of the type providing a substantially 170° field of vision in all directions as indicated above; however, it is to be understood that other comparable lenses having a field of vision up to and including 180° can be incorporated into the device of the present invention without departing from the spirit of the invention.

Still referring to FIG. 2, a flash unit 84 is contemplated for providing sufficient light to enable a picture to be taken by the camera of the present invention, and this preferred embodiment includes a suitable light bulb 85 mounted in the housing 11 and surrounded by a conventional reflector 86 and protected by a suitable transparent cover 87. As illustrated in FIG. 1, the flash unit 84 is directed rearwardly in the automobile 2 to completely flood the passenger section of the automobile with light to enable a sharp picture to be taken by the camera so that the features of the passengers are readily discernible. It has been found that this arrangement provides sufficient light also to the front seat or driver's compartment to provide the desired detail of the driver 4 and the meter 8 for the purpose indicated above. However, in some cases it may be desirable to provide additional flash units 84 directed in other directions in the interior of the automobile being photographed, if additional light is found to be needed.

Figure 5:
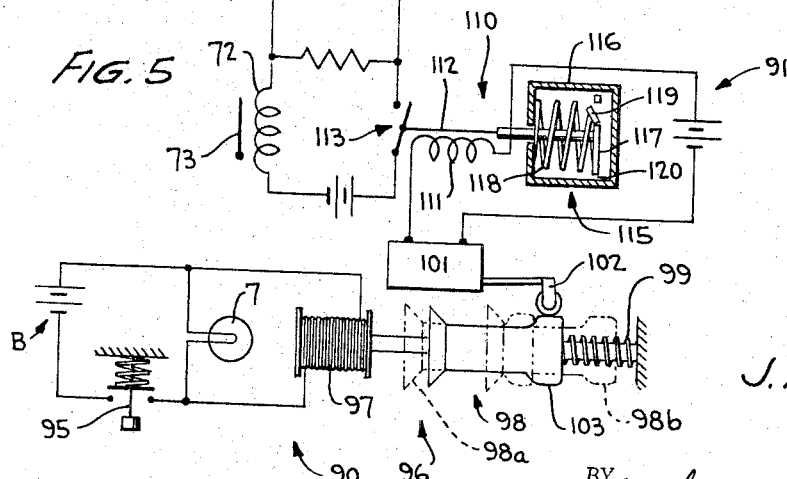
FIG. 5 is a schematic diagram of the control system of the present invention embodied in the preferred form.

The preferred embodiment of the mechanism to control the flash and camera unit 1 of the present invention is illustrated in schematic form in FIG. 5 and comprises an enabling circuit 90, a timing circuit 91 and an actuating circuit 92. The enabling circuit 90, in the preferred embodiment of the invention, includes the usual dome light circuit of a taxicab 2 having, for example, a conventional 12-volt battery B, an on-off switch 95 to be operated by any of the doors 5, 6 and the dome light 7 that illuminates the interior of the automobile in the usual manner when the switch 95 is allowed to close in response to the opening of one of the doors 5, 6. Tapped into this conventional dome light circuit in accordance with the invention is a relay 96 that includes a solenoid 97 that operates a two-position cam 98. In the normal case, the switch 95 is in the open position shown, the light 7 is not illuminated and the solenoid 97 is in an unactuated condition so that it positions the cam 98 in the dashed-line position 98a as indicated in FIG. 5. When one of the doors 5, 6 is opened, the switch 95 is allowed to close thereby lighting the dome light 7 and actuating the solenoid 97 to position the cam 98 in the other dashed-line position indicated at 98b against the force of a spring 99. As long as the door 5, 6 of the automobile 2 is held in the open position, the dome light 7 will remain illuminated and the solenoid 97 will retain the cam 98 in the position 98b of FIG. 5.

The timing circuit 91 includes a micro-switch 101, the operating arm 102 of which engages the two-position surface of the cam 98, as shown in either FIGS. 4 or 5. The microswitch 101 is in the closed position whenever the cam 98 assumes the full-line position of these figures so that raised portion 103 lifts the arm 102 in the manner indicated. As shown in FIG. 4, the cam 98 is retained in the full-line position once the solenoid 97 is de-energized by closing of the door 5, 6 by a retaining lever 104 having a cam-engaging lip 105 and a spring 106 to urge the same into engagement with the end of the cam 98. Adjacent the other end of the pivotal lever 104 is a jogged-out portion 104a (FIG. 3) terminating in a cam follower 107 adapted to engage the cam surfaces 108 formed on the peripheral portion of the shutter 55. It will be realized that the cam 108 will rock the lever 104 about its pivot end so as to free the cam 98 at the proper time and allow it to return to its normal rest position 98a thereby opening the switch 101 in readiness for the succeeding cycle.

The micro-switch 101, whose operation has just been described, serves to close the timing circuit 91, which includes a time delay relay, generally represented by the reference numeral 110. Assuming that the circuit 91 is closed, it will be realized that the time delay relay 110 will operate by the actuation of a solenoid 111 having an armature 112 connected to a switch 113 of the actuating circuit 92.

In the preferred embodiment of the invention, a time delay means is provided on the switch 113 in order to allow the passenger 3 time to assume a final sitting position before his picture is taken by the flash and camera unit 1. This time delay means takes the form of a dash-pot 115 connected to the free end of the armature 112 of the solenoid 111. The dash-pot 115 comprises a fluid chamber 116 with a captive piston 117 adapted for movement therein. A spring 118 serves to position the piston 117 in the right-hand position of FIG. 5 and, thus, also serves to normally hold the switch 113 in the open position through the armature 112. The base of the piston 117 is provided with a one-way valve 119 adapted to open when the piston 117 is traveling toward the right in FIG. 5, but to close when the piston 117 is traveling toward the left as during the actuation of the switch 113 by the solenoid 111. Thus, once the solenoid 111 has been energized, the armature 112 will slowly pull the piston 117 to the left with the fluid in the chamber 116 slowly moving into the opposite or right-hand side of the piston 117 through a small clearance 120 around the periphery of the piston 117. After the solenoid 111 has remained actuated for a predetermined length of time, the switch 113 will finally be allowed to close the actuating circuit 92. When this happens, the flash bulb 85 and the shutter-tripping armature 73 of the solenoid 72 are actuated thereby taking a picture of the interior of the automobile 2 and its occupants.

Summarily speaking, in operation, at any time one of the several doors 5, 6 of the automobile is opened, the switch 95 of the enabling circuit 90 is closed thereby causing the cam 98 to rapidly assume the position 98b by forced movement from the position 98a. It is pointed out at this point that the passage of the raised portion 103 of the cam 98 past the follower of the arm 102 in this instance does not trip the actuating circuit 92 because of the fact that the time delay relay 110 does not have sufficient time to become fully activated against the force of the dash-pot 116 by such a short closing of the timing circuit 91. As the doors 5, 6 are then closed, the switch 95 is opened thereby causing the cam 98 to assume the full-line position in response to the spring 99 and the catch lever 104. At this point, the micro-switch 101 is closed long enough for the time delay relay 110 to become fully activated, and after the predetermined time built in into said relay 110, the switch 113 is allowed to close thereby completing the actuating circuit 92 to fire the armature 73 and the flash bulb 85. As the shutter 55 moves past the exposure window 35 in response to the firing of the armature 73, the point is reached where the cam 108 engages the cam follower 107 to release the enabling cam 98 thereby breaking the timing circuit 91 whereupon the spring 118 of the dash-pot 116 quickly opens the actuating circuit 92 through the switch 113 to release the armature 73 and, thus, allow lever 66 to stop the shutter 55 in readiness for a repeat of the operation just described.

The results and advantages of the present invention should now become readily apparent to those skilled in the art in that a simple and compact device has been provided to conveniently photograph the confined interior of a vehicle or the like in an automatic fashion. Further, the actuation of the camera and flash unit 1 is desirably in response to the sequence of first opening one of the doors 5, 6 of the vehicle, in which the device of the present invention is installed, and then, closing the same, whereupon the picture is taken a predetermined time after the latter occurrence thereby giving the passenger 3 time to get settled and facing forwardly for a good picture.

Some examples of the modifications and variations within the scope of the present invention have already been mentioned and those skilled in the art can appreciate that others can be made without departing from the spirit of the invention. For example, the camera mechanism mounted in the removable housing 12 can be any conventional motorized camera that is easily obtainable, such as a camera sold under the trade name of "Motormatic." Also, the driver of the automobile in which the device of the present invention is mounted can be given control over the device by a suitable override switch, if desired, so that such things as normal and off-duty movements by the driver will not be recorded. It is also contemplated by the present invention that the wide-angle lens 78 may be directed exclusively to the rear passenger compartment whereupon pre-arranged indicia in the field of view is suppplied to identify the particular cab and driver. Further, it may be desirable in certain instances to provide the usual variable lens opening so that the device of the present invention can be used under certain extreme variations in available light as sometimes exists between daytime and nighttime conditions. Consequently, the scope of the invention should be interpreted in the light of the appended claims rather than the embodiment specifically illustrated and described.

What is claimed is:

1. A photo identification apparatus for photographing a person and his surroundings in a confined space that is entered through a door comprising, in combination, a camera having a wide-angle lens directed toward said space, said camera being located on one wall of said confined space, and means for tripping the shutter of said camera for taking a picture, said means including a circuit and a switch actuated by said door for activating said circuit in response to the sequence of first opening and then closing said door to insure that said person is in position completely within said confined space when the picture is taken.

2. A photo identification apparatus for photographing a person and his surroundings in a confined space that is entered through a door comprising, in combination, a camera having a wide-angle lens providing substantially a 170° view of said space, said camera being centrally positioned on one wall of said confined space, said lens being directed outwardly from said wall for a full view of said space, first circuit means for tripping the shutter of said camera for taking a picture, and second circuit means including a switch actuated by said door, for activating said first circuit means in response to the sequence of first opening and then closing said door to insure that said person is in position completely within said confined space when the picture is taken.

3. The combination of claim 2, wherein said second circuit means further includes a time delay means to delay the activation of said first circuit means whereby the operation of said camera is delayed for a predetermined time after said door is closed.

4. A photo identification apparatus for photographing a person and his surroundings in the interior of a vehicle with a dome light, said vehicle being entered through a door, comprising, in combination, a camera having a wide-angle lens directed toward said interior, said camera being located on one wall of said interior, a flash unit for illuminating said interior, a circuit for said dome light, said dome light circuit having a switch means operative in one position for closing said dome light circuit in response to opening said door, a second circuit having a second switch, a first relay means in said dome light circuit for closing said second switch in said second circuit in response to the sequence of first opening and then closing said door, a third circuit having a third switch, a second relay means in said second circuit for closing said third switch in response to closing said second switch, said second relay means having time delay means for delaying the closing of said third switch, and means in said third circuit for actuating said flash unit and simultaneously tripping the shutter on said camera in response to the closing of said third circuit by said third switch, whereby a picture is taken at a predetermined time after said door has been opened and closed.

5. The combination of claim 4 wherein said first relay means comprises a solenoid having an armature adapted for actuation in response to the closing of said dome-light circuit, a cam carried by said armature for movement therewith, said cam having an operating surface for engagement with said second switch, said second switch being operative to close said circuit when said cam is in one position and to open said circuit in all other positions of said cam, latch means for retaining said cam in said one position in response to said solenoid being first actuated and then de-actuated by the sequence of first opening and then closing said door, and means for causing said latch to release said cam from said one position in response to the taking of said picture.

6. The combination of claim 5 wherein said second relay means includes a solenoid having an armature connected to said third switch for actuating of the same, said time delay means including a closed fluid cylinder, a piston mounted for captive reciprocating movement in said piston and attached to said armature for movement therewith, a spring biasing said piston and said armature in one direction to cause said third switch to open, one-way valve means in said piston for creating communication between one side of said piston and the other to allow fluid to pass therebetween when said piston is moving in said one direction, said piston being spaced a sufficient distance from the walls of said chamber to permit a limited amount of fluid to pass during movement of said piston in the other direction, whereby upon actuation of said solenoid the movement of said armature is resisted in said other direction as said armature moves to close said third switch and upon de-actuation of said solenoid said spring serves to open said third switch.

7. A photo identification apparatus for photographing a person and his surroundings in a confined space that is entered through a door comprising, in combination, a base plate adapted for mounting along one wall of said confined space, a stationary housing disposed at one end of said base plate, a removable housing engaging one face of said stationary housing and extending to the other end of said base plate, lock means carried by said removable housing for engagement with the other end of said base plate for connecting said removable housing in its operative position in engagement with said one face of said stationary housing and said base plate, a camera having an exposure station disposed within said removable housing, a wide-angle lens directed towards said space and disposed within said stationary housing, said lens communicating with said exposure station of said camera, a flash unit directed toward said confined space and disposed within said stationary housing, a circular focal plane shutter mounted for rotation in said removable housing, motor means for rotating said shutter, latch means for engaging said shutter for retaining said shutter in an inoperative position, a lever for operatively engaging said latch for causing said latch to release said shutter for rotation past said exposure station, said lever being engageable with said latch upon placing said removable housing in said operative position, and means for actuating said flash unit and for simultaneously actuating said lever for tripping the shutter of said camera for taking a picture, said last mentioned means including an enabling circuit and a switch actuated by said door for activating said enabling circuit in response to the sequence of first opening and then closing said door.

8. The combination of claim 7, wherein said last mentioned means further includes a timing circuit having a second switch, a first relay means in said enabling circuit for closing said second switch in said timing circuit in response to said sequence of first opening and then closing said door, an actuating circuit having a third switch, a second relay means in said timing circuit for closing said third switch in response to closing said second switch, said second relay means having time delay means for delaying the closing of the said third switch, whereby a picture is taken at a predetermined time after said door has been opened and closed.

9. The combination of claim 8, wherein said first relay means comprises a solenoid having an armature adapted for actuation in response to the closing of said dome-light circuit, a cam carried by said armature for movement therewith, said cam having an operating surface for engagement with said second switch, said second switch being operative to close said circuit when said cam is in one position and to open said circuit in all other positions of said cam, latch means for retaining said cam in said one position in response to said solenoid being first actuated and then de-actuated by said sequence of first opening and then closing said door, and means for causing said latch to release said cam from said one position in response to the taking of said picture to de-activate said timing and said actuating circuits.

10. The combination of claim 9, wherein said second relay means includes a solenoid having an armature connected to said third switch for actuation of the same, said time delay means including a closed fluid cylinder, a piston mounted for captive reciprocating movement in said piston and attached to said armature for movement therewith, a spring biasing said piston and said armature in one direction to cause said third switch to open, one-way valve means in said piston for creating communication between one side of said piston and the other to allow fluid to pass therebetween when said piston is moving in said one direction, said piston being spaced a sufficient distance from the walls of said chamber to permit a limited amount of fluid to pass during movement of said piston in the other direction, whereby upon actuation of said solenoid the movement of said armature is resisted in said other direction as said armature moves to close said third switch and upon de-actuation of said solenoid said spring serves to rapidly open said third switch.

11. The combination of claim 9, wherein said means for de-activating said timing and said actuating circuits includes a second cam disposed on said shutter for biasing said latch out of the path of said first-mentioned cam and spring means for biasing said cam to its normal position upon release by said latch whereby said second switch is opened to cause said timing and said actuating circuit to open, said second cam on said shutter engaging said latch in the final stages of movement of said shutter past said exposure station, whereby said timing and said actuating circuits are opened in readiness for the taking of the next picture after said picture has been taken.

References Cited

UNITED STATES PATENTS

| | | | |
|---|---|---|---|
| 1,230,247 | 6/1917 | Weitzman | 340—221 |
| 2,109,361 | 2/1938 | Spiegel | 95—11 |

JOHN M. HORAN, *Primary Examiner.*